United States Patent [19]
Johnson et al.

[11] 3,918,836
[45] Nov. 11, 1975

[54] MAIN ROTOR ELASTOMERIC BEARING SEAL

[75] Inventors: Glenn E. Johnson, Fort Worth; Martin H. Lufkin, Hurst, both of Tex.

[73] Assignee: Textron, Inc., Providence, R.I.

[22] Filed: Nov. 13, 1973

[21] Appl. No.: 415,302

[52] U.S. Cl. ............... 416/136; 277/92; 308/36.1; 308/187.1; 308/238; 416/135
[51] Int. Cl.² ................ B63H 3/00; B64C 11/06; B64C 11/12; F16C 33/78
[58] Field of Search ......... 277/92; 308/36.1, 187.1, 308/238; 403/225; 416/117, 134 A, 135, 136, 138, 140, 163, 239

[56] References Cited
UNITED STATES PATENTS

| | | | |
|---|---|---|---|
| 2,303,090 | 11/1942 | Pranger et al. | 308/187.1 X |
| 2,830,669 | 4/1958 | Klockner | 416/163 |
| 3,106,965 | 10/1963 | Gorndt et al. | 416/134 A |
| 3,111,172 | 11/1963 | Grondt et al. | 403/225 |
| 3,193,019 | 7/1965 | Drees et al. | 416/140 |
| 3,237,698 | 3/1966 | Gandy | 308/187.1 X |
| 3,280,918 | 10/1966 | Drees et al. | 416/117 |
| 3,292,712 | 12/1966 | Schmidt | 416/239 |
| 3,341,259 | 9/1967 | Schulz et al. | 277/92 X |
| 3,520,637 | 7/1970 | Tobey | 416/135 |
| 3,652,185 | 3/1972 | Cresap et al. | 416/134 A |

*Primary Examiner*—M. Henson Wood, Jr.
*Assistant Examiner*—Howard Beltran
*Attorney, Agent, or Firm*—Richards, Harris & Medlock

[57] ABSTRACT

A lubricant seal for a grip and spindle assembly attaching rotor blades to a helicopter mast. An elongated grip has a clevis for attachment to a helicopter blade. A spindle extends into a chamber in the inboard end of the grip. The grip is mounted to rotate on the spindle for blade pitch change. An annulus between the exterior of the spindle and inside of the grip houses bearing means rotatably positioning the grip on the spindle. Lubricant in the annulus is sealed in by seals positioned at the ends of the annulus. The seals are elastomeric cylinders each having one end rigidly attached to the spindle and the other end rigidly attached to the grip.

11 Claims, 4 Drawing Figures

MAIN ROTOR ELASTOMERIC BEARING SEAL

The present invention relates to improvements in grip and spindle assemblies for use in attaching blades to the yoke of a helicopter mast. The invention is directed to an improved seal for preventing the loss of lubricant from a grip and spindle assembly.

In the design of helicopter craft, a plurality of main rotor blades is attached to a vertically extending rotatably powered mast. In operation, the blades rotate at high speeds creating centrifugal forces at the point of attachment of the blades to the mast. The control of a helicopter during flight involves limited rotation of individual blades about radially extending pitch axes. Pitch rotation of each blade of from 50° to 60° may be accommodated. Pitch rotation requirements and the centrifugal loads present challenging design problems in the attachment of the blade to the yoke.

Conventionally, blades have been attached to the rotor yoke by means of a grip-spindle assembly which permits pitch change. Separate spindle and grip members are rotatably attached together. A flexible strap transfers centrifugal loads from grip to spindle. Bearings which allow rotation of the blade about its pitch axis require a lubricant. Sliding seals or packing were conventionally provided to seal the bearings and to prevent loss of lubricant during operation of the helicopter.

Failure of lubricant seals results in accelerated bearing wear or a failure in the bearing which could present a serious hazard during operation of the helicopter. Periodic maintenance replacing the bearings and lubricants to the bearing tends to assure a reliable operation of the bearings. Although frequent servicing of the grip and spindle assembly can reduce serious lubricant problems present in the bearings, it has not been completely satisfactory. In addition, seal leaks permit lubricant to fall onto the fuselage, inhibiting vision through the transparent portions of the fuselage or falling on the persons servicing the aircraft itself.

Sliding seals conventionally used in grip-spindle assemblies over prolonged periods of time experience deterioration of the frictional contact between a seal and its associated sealing surfaces leading to failure. In addition, relative movement between the various portions of the grip-spindle assembly due to stresses created in the apparatus by deflection loads and temperature changes can also effect sealing efficiency.

These reductions in efficiency become important when it is considered that during rotation of the rotor, centrifugal forces acting on a lubricant can create pressure forces which are exerted against the seals themselves.

Therefore, there exists a need for an effective seal for use in the grip-spindle assembly of a helicopter which allows pitch change of the blade and prevents loss of lubricant from the bearings.

The present invention provides an improved seal for the bearing lubricant in the grip-spindle assembly. More particularly, there is provided an improved seal for use with the grip-spindle assembly which is flexible with one end attached to the spindle member and the other end attached to the grip member.

In accordance with the invention an elongated grip member has a clevis formed on the outboard end for attachment to the blade and a chamber formed therein. A spindle member is rotatably mounted in the grip chamber. Attachment ears on the inboard end of the spindle provide for attachment of the spindle to a yoke on a helicopter mast. A connector between the grip and spindle members allows relative rotation therebetween while transferring centrifugal loads from the grip member to the spindle member. Bearings are mounted in the annulus between the grip chamber and the spindle member. Elastomeric seal members are positioned to close the annulus. Each seal member has one end in sealing attachment to the grip member and the other end in sealing attachment to the spindle member to provide a positive closure across the annulus for retention of lubricant in the annulus.

A more complete understanding of the advantages and objects of the present invention will become apparent from the following Detailed Description when considered in connection with the accompanying Drawings in which.

Figure 1:
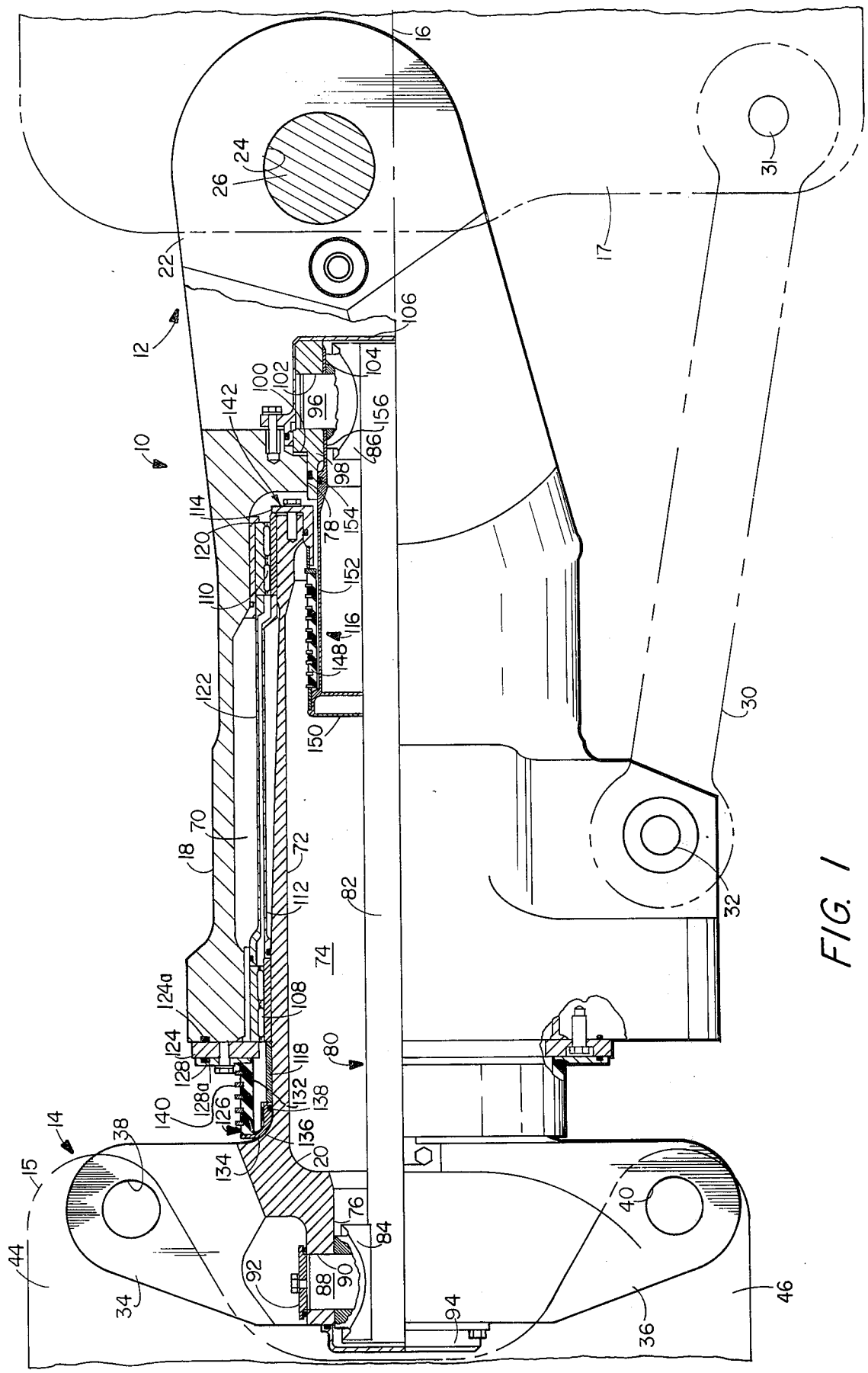
FIG. 1 illustrates a plan view of the grip spindle assembly partially in section with an improved sealing arrangement shown installed therein and with a rotor yoke, blade and drag brace shown by phantom lines.

Referring now to the Drawings wherein like reference characters designate like or corresponding parts throughout the several views, FIGS. 1–4 illustrate a grip-spindle assembly for use in attaching a blade to the yoke of a helicopter rotor. The assembly 10 is provided with an outboard end 12 for attachment to a main rotor blade and an inboard end 14 for attachment to the yoke of the helicopter mast.

Assembly 10 is provided with means which will be hereinafter described in detail for allowing outboard end 12 to rotate with respect to inboard end 14 about a pitch axis 16 through an approximate angle of 50° to 60°. Pitch axis 16 extends radially from rotor yoke 15 through the assembly 10 and along the length of the rotor blade 17. Pitch axis 16 defines the axis about which blade 17 rotates during pitch adjustments.

Suitable pitch horn structure is provided for causing blade 17 to rotate about pitch axis 16 to adjust the pitch of the rotor during operation of the helicopter. Assembly 10 is fixed to yoke 15 which in turn rotates about the mast axis positioned to the left of end 14 and extending perpendicular to the plane of the paper as seen in FIG. 1.

Assembly 10 has a grip member 18 and a spindle member 20 which are pivotally coupled. Grip 18 has a clevis portion 22 with a bore 24 extending therethrough. The inboard end of blade 17 is provided with a corresponding bore which is aligned with bore 24 and through which a clevis pin 26 is inserted to attach blade 17 to grip 18.

A drag brace 30 is illustrated by phantom lines and has one end attached to the inboard end of blade 17 at a point 31 trailing pin 26. The other end of brace 30 is pivotally attached to grip 18 by a suitable pin at 32.

Figure 2:
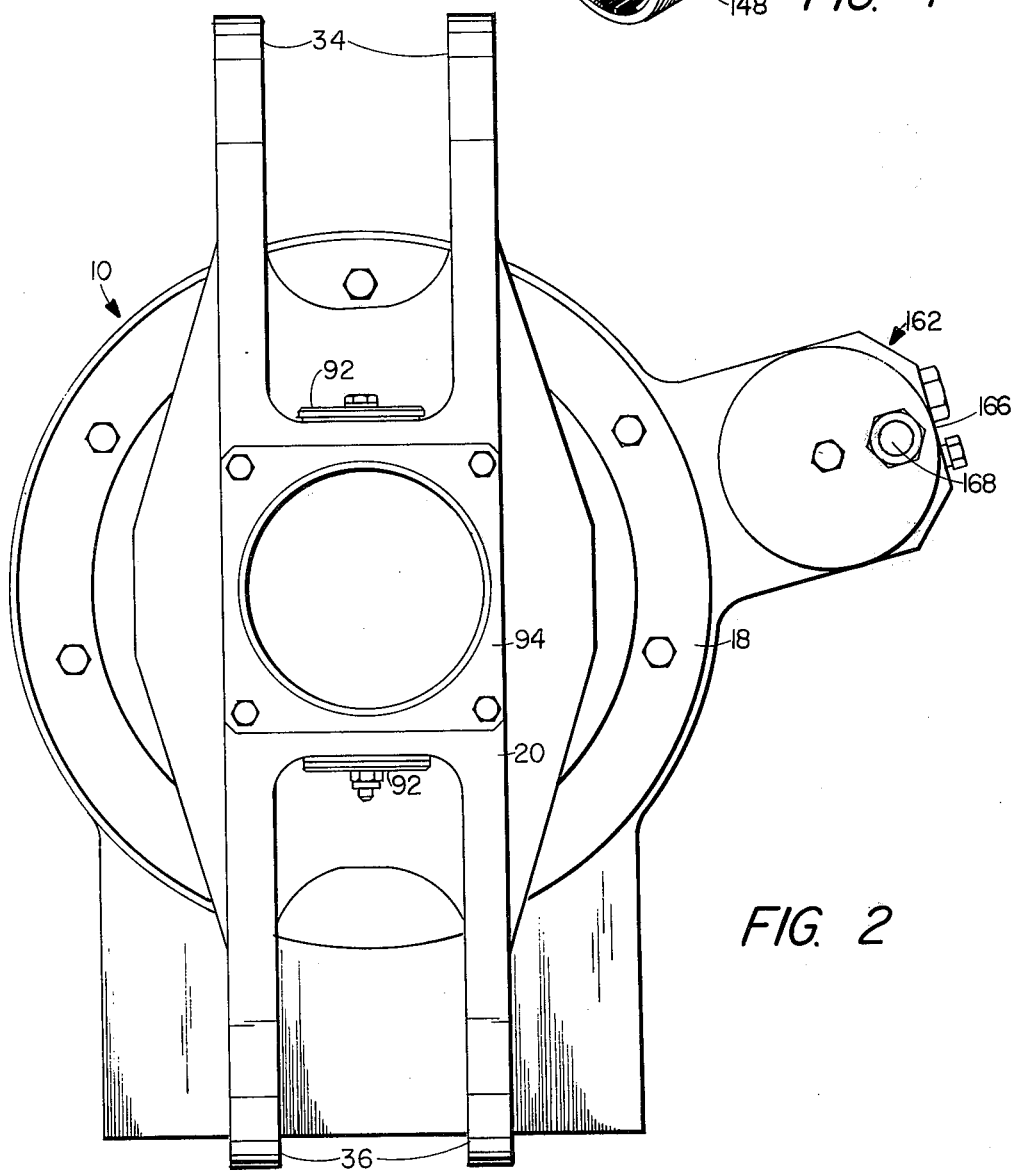
FIG. 2 is an end view of the inboard end of the grip spindle assembly.

As can best be seen in FIG. 2, spindle 20 is provided with a pair of leading ears 34 and a pair of trailing ears 36. Ears 34 and 36 are positioned in spaced parallel relationship a distance equal the thickness of yoke 15 and on opposite sides of pitch axis 16. Ears 34 and 36 are provided with parallel bores 38 and 40, respectively.

Lug 44 of yoke 15 extends between the ears 34 and lug 46 extends between ears 36. Lug 44 is provided with a bore which aligns with bores 38. Lug 46 is provided with a bore which aligns with bores 40 to allow the attachment of the yoke to assembly 10 by means of suitable pins or bolts.

In FIG. 1, the interconnection of the grip and spindle members is shown partially in section. Grip 18 has an elongated chamber 70 which is open at the inboard end thereof. Chamber 70 is of such a size to allow the insertion of an elongated spindle cylinder 72 therein. Spindle 20 is also provided with a hollow elongated chamber 74 which extends substantially along the length of cylinder 72. A bore 76 connects chamber 74 with the exterior of the inboard end of spindle 20 while bore 78 opens chamber 70 through the outboard end of grip 18.

A strap assembly 80 is positioned in chamber 74 and has its ends anchored in bores 76 and 78 to anchor grip 18 to spindle 20. Strap assembly 80 transfers centrifugal loads created upon rotation of the blades from the grip 18 to spindle 20.

Strap assembly 80 is conventional, being constructed from a plurality of loops of steel wires 82 which are encased in urethane rubber. One end is attached to an inboard spool 84 and the other end attached to an outboard spool 86.

Inboard spool 84 is fixed in position in bore 76 by means of a pin 88. Pin 88 extends through the center of spool 84 and through bore 90 which radially intersects bore 76. End caps 92 can be provided with suitable seals and attached over the open ends of bore 90. An end cap 94 with suitable seals is removably attached over the inboard end of bore 76 to allow insertion of spool 84 into the bore.

Outboard spool 86 is attached to grip 18 by means of a pin 96 and an outboard strap fitting 98. Outboard strap fitting 98 is inserted in a bore 78. A shoulder 100 limits axial movement of the strap fitting 98 through bore 78. Spool 86 is attached to fitting 98 by means of pin 96 which is inserted through bore 102 which radially intersects the axial passage 104 through fitting 98. Fitting 98 is provided with a seal ring between the fitting 98 and bore 78. An end cap 106 is removably attached over the outboard end of bore 78 and is provided with suitable seals to seal the bore 78.

Thus, the grip member 18 and the spindle member 20 are attached together by means of a flexible strap assembly 80 which twists to allow relative rotation between the grip and spindle members and which transfers centrifugal forces from the grip 18 to spindle 20.

Inboard and outboard bearing assemblies 108 and 110, respectively, have their inner races mounted on the exterior surface of cylinder 72. An inner race bearing spacer 112 is positioned bewteen the inner races of bearings 108 and 110 to hold the same in axial position. Suitable seals in spacer 112 contact the exterior of cylinder 72. The outboard side of the inner race of assembly 110 is held in position on cylinder 72 by means of a shoulder 114 on an outboard seal assembly 116. The inboard end of the inner race of assembly 108 is held in position on cylinder 72 by means of an annular spacer 118.

The outer races of bearings 108 and 110 are supported by the inner wall of the chamber 70. The outer race of bearing 110 is held in position on the outboard side against a shoulder structure 120 and on the inboard side by means of a bearing spacer 122. Spacer 122 extends between the outer race of bearing 110 and the outer race of bearing 108 to hold the same in axial position in the chamber 70. Suitable seals are provided on spacer 122 to seal between the spacer and the inner wall of chamber 70.

The inboard side of the outer race of bearing 108 is held in axial position by a retaining ring 124 which is attached to the inboard end of grip 18. In this manner, bearings 108 and 110 rotatably mount the grip 18 on spindle 20 with spacers 112 and 122 defining an annulus therebetween.

According to the present invention, the inboard side of bearing 108 and outboard side of bearing 110 are sealed, respectively, by inboard seal assembly 126 and outboard seal assembly 116. Assemblies 116 and 126 stop the annulus between the grip and spindle members to provide an elastomeric non-sliding structure.

Figure 3:
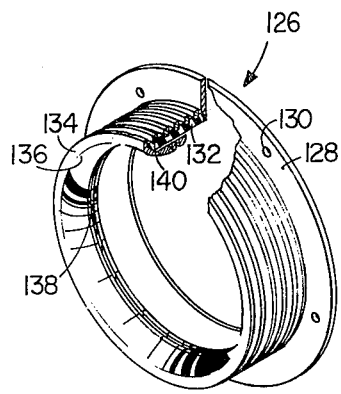
FIG. 3 is a perspective view of the inboard seal assembly.

Seal assembly 126 in FIG. 3 has an annular ring 128 for attachment adjacent to ring 124. Ring 128 is provided with a plurality of bores 130 which align with similar bores in ring 124 and are utilized to removably attach rings 128 and 124 to the inboard end of grip 18. Seal rings 128a and 124a are provided to prevent the loss of lubricant along bores of rings 124 and 128.

A cylindrical elastomeric seal member 132 is bonded to ring 128 and extends inboard to a second ring 134. Ring 134 has an arcuate surface 136 which seats on the exterior of spindle 20. A seal ring 138 is provided on the arcuate surface 136 to seal ring 134 to spindle 20. Ring 134 is held in position against a shoulder on spindle 20 by a spacer cylinder 118.

In addition, a plurality of axially spaced metallic rings 140 are bonded in the exterior zone of seal 132 to prevent wrinkling of the seal during pitch rotation.

Thus, seal 126 is cylindrical in shape and is attached between the exterior of spindle 20 and the inboard end of grip 18. This provides a positive seal between grip 18 and spindle 20 to prevent the loss of lubricant at the inboard end.

Figure 4:
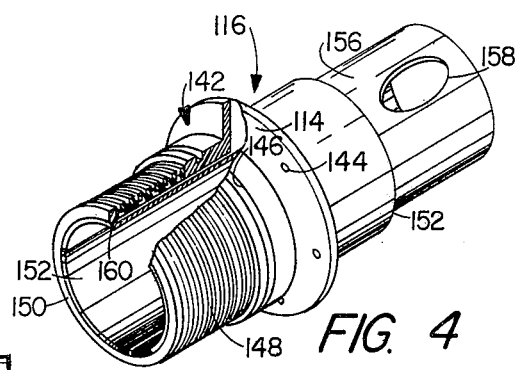
FIG. 4 is a perspective view of the outboard seal assembly.

The outboard end of the annulus is sealed by the outboard seal member 116 in a manner similar to the inboard configuration. Seal 116 is illustrated in FIG. 4. Shoulder 114 is part of an annular ring 142. Ring 142 has an annular ring of bores 144 therein and a seal 146 for sealing attachment to the outboard end of the spindle 20. An elastomeric cylinder 148 is bonded to ring 142 and extends in an inboard direction therefrom. The inboard end of seal 148 is bonded to a cylindrical seal housing 150. Seal housing 150 is of rigid metallic material and has an elongated reduced diameter portion 152 which extends outboard concentrically in cylinder 148. A suitable seal 154 is provided on the exterior of reduced portion 152 to contact the interior of outboard strap fitting 98. In addition, a further reduced cylindrical portion 156 extends through the interior of fitting 98 to attach housing 150 to fitting 98. A bore 158 is provided in portion 156 to accommodate the pin 96.

A plurality of metallic axially spaced annular rings 160 are bonded in the outer surface of seal 148 to prevent wrinkling of the seal during relative rotation of the spindle and grip members.

The lubricant reservoir assembly 162, illustrated in FIG. 2, provides for storage lubricant. Reservoir 162 communicates with the annulus in which bearings 108 and 110 are mounted. Storage in reservoir 162 provides a supply of lubricant for the bearings as necessary. Reservoir 162 may be provided with a sight glass 166 for use in checking the amount of lubricant present. A suitable fitting 168 may be provided for adding lubricant to reservoir 162.

OPERATION OF THE DEVICE

Spindle member 20 is attached to yoke 15. Grip 18 is likewise attached to main rotor blade 17 by means of pin 26 and drag brace 30. A means not disclosed and not a part of the present invention is provided on the exterior of the yoke 15 for rotating grip 18 with respect to spindle 20 about the pitch axis 16 for change in pitch of blade 17.

Bearing assemblies 108 and 110 maintain the grip and spindle assembly in alignment upon relative rotation therebetween. The annulus in which bearings 108 and 110 are located is supplied with suitable lubricant from lubricant reservoir assembly 162.

During rotation of the grip 18 on spindle 20, seal assemblies 116 and 126 will be twisted while maintaining a positive seal. A twisting of the flexible seals will result from relative rotation between grip 18 and spindle 20. Seal assemblies 116 and 126 are centered on pitch axis 16. The lengths of the seals allow sufficient relative rotation and deflection within the seal members. Metallic rings such as rings 140 and 160, FIGS. 3 and 4, bonded into the body of the seal members reduce wrinkling of the elastomeric body upon rotation.

Thus, it can be seen that by the provision of elongated annular seals and by attaching opposite ends of the seals between the two members which are to be relatively moved that the space between the two members can be positively sealed without utilizing a sliding seal arrangement. This provides a positive barrier against the loss of lubricant and eliminates the disadvantages present in sliding seals from wear, deflection and other adverse factors.

It is to be understood, of course, that the particular shape of the seals disclosed is a necessity of the particular configuration of the grip and spindle assembly illustrated. Obviously, in other grip and spindle assembly configurations, seals embodying the concepts of the present invention would vary in size and shape from those illustrated and other configurations of the invention than those disclosed could be utilized without departing from the spirit and scope of the present invention as defined in the appended claims.

What is claimed is:

1. A device for rotatably attaching a blade to a mast of a helicopter comprising:
   a. an elongated grip member having a mounting means at the outboard end for attachment to a rotor blade;
   b. a spindle member having a mounting means at the inboard end for attachment to a mast, one of said members is hollow to define a chamber and the other of said members is of spindle structure for insertion into said chamber to form an annulus between said members;
   c. coupling structure including bearing means positioned in said annulus between said members; and
   d. flexible seal means positioned at the ends of said annulus, each said seal means spanning said annulus and having ends thereon, each said seal means having one end thereof rigidly fixed to said grip member and the other end rigidly fixed to said spindle member to close said annulus for retention of lubricant therein for said bearing means.

2. A device as defined in claim 1 wherein said seal means are cylindrical shaped.

3. A device as defined in claim 2 further comprising annular stiffening rings bonded in said seal means.

4. In combination with a grip-spindle assembly for attaching a blade to a mast of a helicopter having an elongated grip member with a mounting means at the outboard end for attachment to a rotor blade, a spindle member having a mounting means at the inboard end for attachment to a helicopter mast, one of said members defining a chamber and an end portion on the other of said members inserted therein to define an annular space between said members, coupling structure including bearing means positioned in said annular space for rotatably positioning the exterior of said end portion within said chamber;

the improvement which comprises flexible seal means positioned at the ends of said annular chamber to seal the ends of said chamber, each said seal means spanning said annular chamber and having ends thereon, each of said seal means having one end rigidly fixed to said grip member and to the other end rigidly fixed to said spindle member.

5. The combination as defined in claim 4 wherein said seal means are cylindrical shaped.

6. The combination defined in claim 5 wherein annular stiffening rings are bonded to said seal means.

7. The combination set forth in claim 4 wherein said seal means are elastomeric circularly ribbed cylinders molded to rings on each end of each of said cylinders and anchored by means of said rings.

8. Means for attaching a blade to the mast of a helicopter comprising:
   a. an elongated grip member having a flange at the outboard end for attachment to the blade and a cylindrical chamber formed in the inboard end thereof;
   b. a spindle member having one end portion extending into said cylindrical chamber, a flange on the inboard end of said spindle for attachment to said mast, said one end portion of said spindle and the wall of said chamber defining an annulus therebetween;
   c. a flexible strap means interconnecting said grip and said spindle members for relative rotation about the center of said chamber and for transferring centrifugal loads between said grip and said spindle members;
   d. a pair of axially spaced bearing means positioned in said annulus rotatably supporting said grip member in said spindle member;
   e. a pair of cylindrical flexible seal means positioned at the ends of said annulus on opposite sides of said bearings; each of said seal means having one end rigidly fixed to said grip and the other end rigidly fixed to said spindle; and
   f. annular stiffening members bonded to said seal means.

9. Means for attaching a blade to the mast of a helicopter comprising:
   a. an elongated grip member having a flange at the outboard end for attachment to the blade and a cylindrical chamber formed in the inboard end thereof;
   b. a spindle member having one end portion extending into said cylindrical chamber, a flange on the inboard end of said spindle for attachment to said mast, said one end portion of said spindle and the wall of said chamber defining an annulus therebetween;

c. a flexible strap means interconnecting said grip and said spindle members for relative rotation about the center of said chamber and for transferring centrifugal loads between said grip and said spindle members, a pin assembly mounted in the outboard end of said chamber in said grip, said pin assembly connecting the outboard end of said flexible strap to said grip and the inboard end of said strap being connected to the inboard end of said spindle;

d. a pair of axially spaced bearing means positioned in said annulus rotatably supporting said grip member in said spindle member; and e. a pair of cylindrical flexible seal means positioned at the ends of said annulus on opposite sides of said bearings, said inboard seal means having one end rigidly fixed to said grip and the other end rigidly fixed to said spindle, said outboard seal means having one end rigidly fixed to said spindle member and the other end rigidly fixed to said pin assembly.

10. The means defined in claim 9 further comprising annular stiffening rings bonded in each of said seal means.

11. The means of claim 9 wherein each of said seal means are elastomeric circularly ribbed cylinders molded to rings on each end of each of said cylinders and anchored by means of said rings.

* * * * *